(12) United States Patent
Shioji et al.

(10) Patent No.: US 7,052,039 B2
(45) Date of Patent: May 30, 2006

(54) INFLATOR

(75) Inventors: Hiroshi Shioji, Himeji (JP); Yasunori Iwai, Shijyonawate (JP); Masakazu Tokuda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 326 days.

(21) Appl. No.: 10/454,674

(22) Filed: Jun. 5, 2003

(65) Prior Publication Data

US 2004/0066024 A1    Apr. 8, 2004

Related U.S. Application Data

(60) Provisional application No. 60/434,420, filed on Dec. 19, 2002, provisional application No. 60/386,757, filed on Jun. 10, 2002.

(30) Foreign Application Priority Data

Jun. 5, 2002   (JP) ............................. 2002-163908
Dec. 13, 2002  (JP) ............................. 2002-362784

(51) Int. Cl.
     *B60R 21/26*     (2006.01)
(52) U.S. Cl. ....................... 280/736; 280/740; 280/741
(58) Field of Classification Search ................ 280/737, 280/736, 740, 741, 742; 55/410, 523, 525; 422/167, 305
See application file for complete search history.

(56) References Cited

U.S. PATENT DOCUMENTS

| 5,031,932 | A |  | 7/1991 | Frantom et al. |
| 5,660,412 | A |  | 8/1997 | Renfroe et al. |
| 5,820,162 | A |  | 10/1998 | Fink |
| 6,474,685 | B1 | * | 11/2002 | Meixner et al. ............ 280/741 |
| 2003/0098572 | A1 |  | 5/2003 | Katsuda et al. |

FOREIGN PATENT DOCUMENTS

| JP | 3001985 B2 | 11/1999 |
| JP | 2000-508985 A | 7/2000 |
| JP | 2000-225914 A | 8/2000 |
| JP | 3127300 B2 | 11/2000 |
| JP | 2002-79902 A | 3/2002 |

* cited by examiner

*Primary Examiner*—Eric Culbreth
(74) *Attorney, Agent, or Firm*—Birch, Stewart, Kolasch & Birch, LLP (57) ABSTRACT

An inflator, includes: an inflator housing which has an opening portion and charged with a pressurized gas; a diffuser portion provided in an opening portion side of the inflator housing and having a gas discharging port for discharging outside a pressurized gas flowing from the opening portion at activation; a first rupturable plate closing a pressurized gas flow path between the inflator housing and the diffuser portion; and a filter disposed between the first rupturable plate and the gas discharging port, the filter including one of a flat plate with a plurality of holes or a wire mesh and a surface of the filter in a first rupturable plate side having a concave portion and a convex portion.

6 Claims, 10 Drawing Sheets

INFLATOR

This nonprovisional application claims priority under 35 U.S.C. § 119(e) on U.S. Provisional Application Nos. 60/386,757 and 60/434,420 filed on Jun. 10, 2002 and Dec. 19, 2002 and under 35 U.S.C. § 119(a) on Patent Application Nos. 2002-163908 and 2002-362784 filed in Japan on Jun. 5, 2002 and Dec. 13, 2002, which are herein incorporated by reference.

BACKGROUND OF THE INVENTION

1. Field of the Invention

The present invention relates to an inflator in which a flow amount of a pressurized gas can be kept stable at a time of activation, and a filter for an inflator suitable for the inflator.

2. Description of the Related Art

Figure 1:
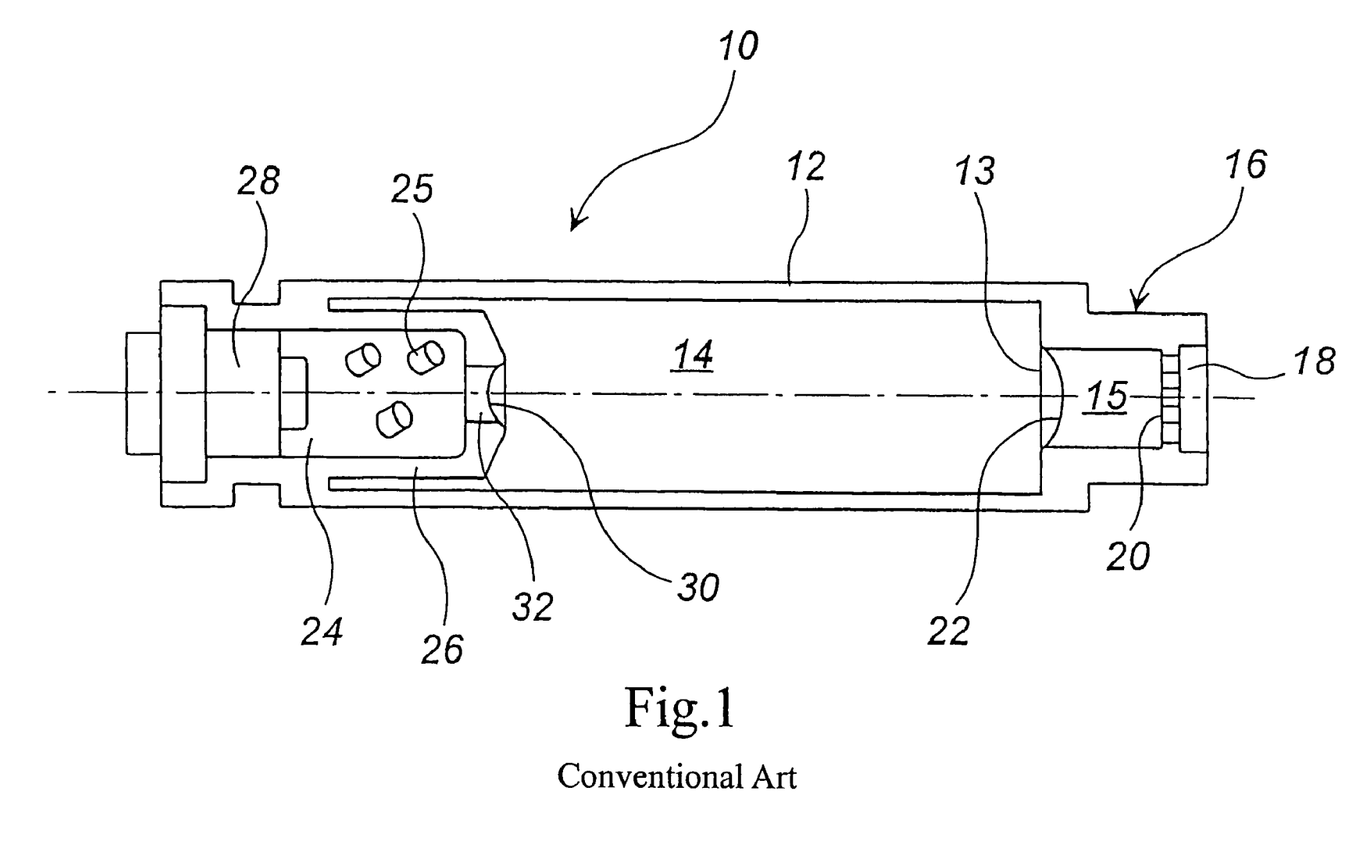
FIG. 1 is an axial sectional view of an inflator.

In a conventional inflator for an air bag utilizing a pressurized gas, as shown in FIG. 1, a filter 20 is disposed in front of a gas discharging port 18 to prevent fragments of a first rupturable plate 22 or the like from entering an air bag. As the filter 20, a wire mesh or a porous flat plate is used.

Figure 6:
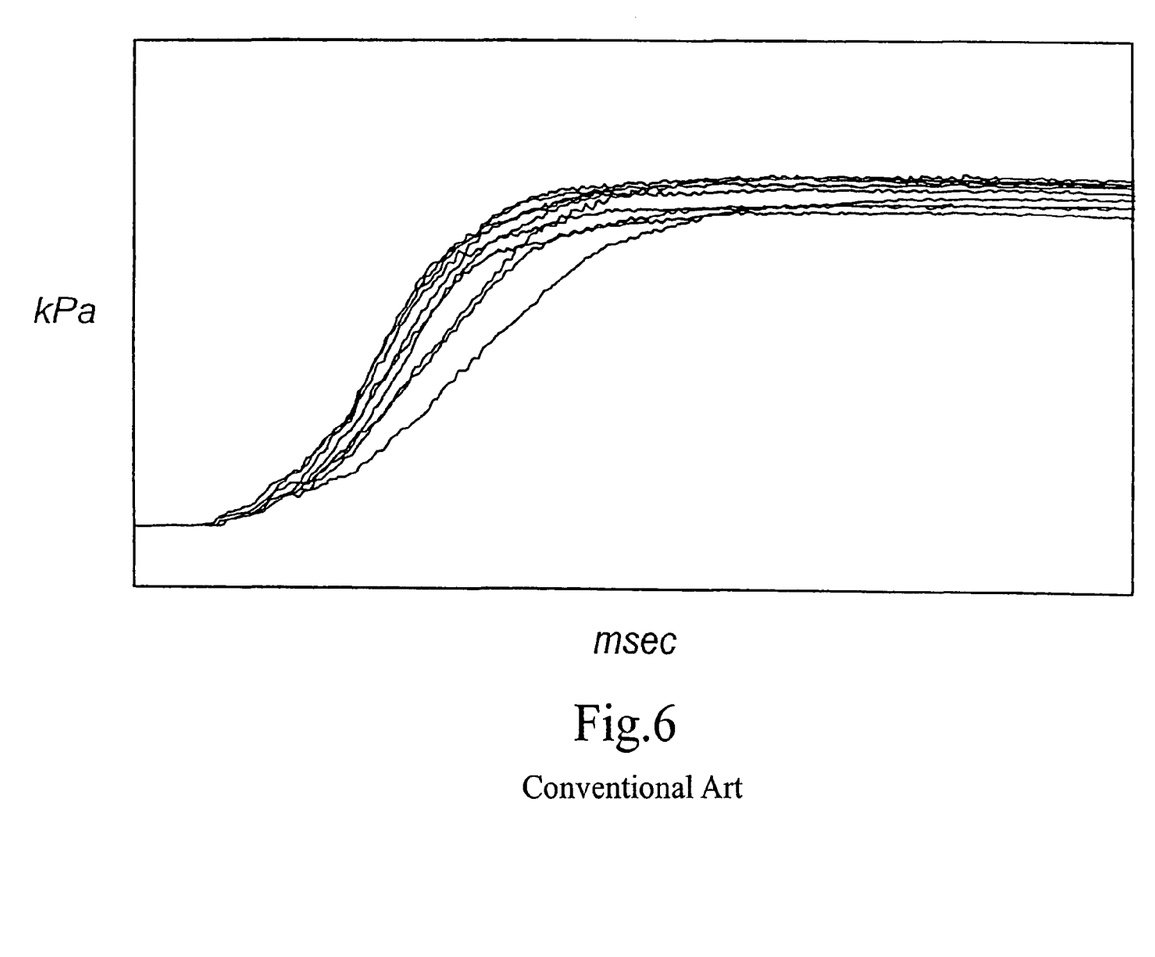
FIG. 6 is a graph showing 60 L tank-test results of the inflator of a conventional art.

In the inflator shown in FIG. 1, however, the filter 20 is formed flat, and, when the first rupturable plate 22 is ruptured into small fragments at activation, plural fragments close holes in the filter 20, blocking flow of the pressurized gas. As a result, even if inflators having the same specification are used, there occur variations in activation performance among the inflators as shown in FIG. 6. FIG. 6 shows pressure changes in a tank in a 60-liter tank test, in which there is variations in pressure change with time. The details of a test method shown in FIG. 6 are similar to examples. Thus, when variations among inflators occur in pressure change at the time of activating the inflators, variations occur among inflated states of air bags, which has to be improved in view of a passenger protection.

As related art JP-B No. 3001985 and JP-A 2000-508985 are known.

In JP-B No. 3001985, an opening portion of a container including a pressurized medium is closed by a burst disc, and a filter is disposed in front of the burst disc. The filter prevents fragments of the burst disc from entering a valve assembly.

In JP-A 2000-508985, a top member formed with an outlet is attached to an end portion of a pressure container containing a pressurized medium and a disk is further when variations among inflators occur in pressure change at the time of activating the inflators, variations occur among inflated states of air bags, which has to be improved in view of a passenger protection.

As related arts, JP-B No. 3001985 and JP-A 2000-508985 are known.

In the invention described in JP-B No. 3001985, an opening portion of a container including a pressurized medium 50 is closed by a burst disc 48, and a filter 108 is disposed in front of the burst disc. The filter 108 prevents fragments of the burst disc 108 from entering a valve assembly 40. In the invention described in JP-A 2000-508985, a top member 30 formed with an outlet 40 is attached to an end portion of a pressure container 22 containing a pressurized medium and a disk 34 is further arranged. A perforated screen, a filter or a trap 42 is disposed between the outlet 40 and the disk 34. The screen 42 arrests particles contained in a discharged gas flow.

DISCLOSURE OF THE INVENTION

An object of the present invention is to provide an inflator which can easily keep a flow amount of a pressurized gas constant at activation of the inflator, and a filter for an inflator suitable for the inflator.

The invention described in claim 1 provides, as one means for solving the above-described problem, an inflator comprising an inflator housing which has an opening portion and is charged with a pressurized gas, a diffuser portion which is provided in the opening portion side of the inflator housing and has a gas discharging port for discharging outside a pressurized gas flowing from the opening portion at activation, and a first rupturable plate closing a pressurized gas flow path between the diffuser portion and the gas discharging port, wherein a filter is disposed between the first rupturable plate and the gas discharging port, the filter comprises a flat plate with many holes except for a wire mesh, and a surface of the filter in the first rupturable plate side has a concave portion and a convex portion.

As described above, by forming the filter to have a porous flat shape having a concave portion and a convex portion on the surface, even if plural fragments are produced and attached to the surface of the filter when the rupturable plate is ruptured, the filter surface is not covered with fragments and a flow path for the pressurized gas is always secured, because the filter surface is provided with the concave portion and the convex portion. Accordingly, a flow amount of the pressurized gas is kept constant.

The above-described invention can employ such a constitution that a convex portion of the filter is formed continuously and a concave portion thereof forms a groove, or such a constitution that a convex portion of the filter is formed continuously and a concave portion thereof forms a single or double or more concentric grooves, or alternatively such a constitution that a convex portion of the filter includes plural independent projections.

By arranging the concave and convex portions of the filter surface in the above manner, the action described above can be suitably done.

In the above-described invention, it is preferable that a flow amount of the pressurized gas is adjusted by the many holes formed in the filter. By employing such a constitution, the pressurized gas flow is adjusted easily, so that design and manufacture of an inflator can be made easy.

The invention described in claim 6 provides, as another means for solving the above-described problem, an inflator comprising an inflator housing which has an opening portion and is charged with a pressurized gas, a diffuser portion which is provided in the opening portion side of the inflator housing and has a gas discharging port for discharging outside a pressurized gas flowing from the opening portion at activation, and a first rupturable plate closing a pressurized gas flow path between the diffuser portion and the gas discharging port, wherein a screen is disposed between the first rupturable plate and the gas discharging port, a filter is disposed to contact the screen, the filter is porous and have a sectional configuration of an arc shape, and the filter is disposed such that an opening portion thereof is directed to the first rupturable plate side and a spherical surface thereof contacts with the screen.

When a filter having a sectional configuration of an arc shape (that is, a filter having a shape like a cut hollow sphere, preferably, a semi-spherical shape or a shape similar thereto) is used, it acts in a manner similar to the filter of the invention described in claim 1. In particular, since the filter is disposed such that its opening is directed to the first rupturable plate side and the spherical surface contacts with the screen, fragments tend to be stored in a bottom (a bottom of a sphere) of an inner surface of the filter. At this time, since the holes on the peripheral surface of the filter are kept ventilated, the above action can be suitably obtained.

Further, the invention described in claim 7 provides, as another means for solving the above-described problem, an inflator comprising an inflator housing which has an opening portion and is charged with a pressurized gas, a diffuser portion which is provided in the opening portion side of the inflator housing and has a gas discharging port for discharging outside a pressurized gas flowing from the opening portion at activation, and a first rupturable plate closing a pressurized gas flow path between the diffuser portion and the gas discharging port, wherein a screen is disposed between the first rupturable plate and the gas discharging port, a filter is disposed to contact the screen, the filter is porous and have a sectional configuration of an arc shape, and the filter is disposed in a state that a spherical surface thereof is directed to the first rupturable plate side and a peripheral edge of an opening portion thereof contacts with the screen.

When a filter having a sectional configuration of an arc shape (that is, a filter having a shape like a cut hollow sphere, preferably, a semi-spherical shape or a shape similar thereto) is used, it acts in a manner similar to the filter of the invention described in claim 1. In particular, since the filter is disposed such that its spherical surface is directed to the first rupturable plate side and the peripheral edge of an opening portion thereof contacts with the screen, fragments tend to be stored not in the top of the sphere but in the vicinity of a portion between the filter peripheral surface and an inner wall surface of the diffuser portion. At this time, since the holes on the peripheral surface of the filter are kept ventilated, the above action can be suitably obtained.

In the above-described invention, plural independent projections, or one or two or more grooves can be formed on a surface of the filter having a semi-spherical shape or the like in the first rupturable plate side, and the grooves can be formed concentrically.

In the above-described invention, the filter has an extension portion which is extended from a peripheral edge of the opening portion of the semi-spherical filter and the extension portion can be formed such that the more it is extended from the peripheral edge of the opening portion, the smaller an outer diameter of the extension portion becomes than the peripheral edge of the opening portion. Since the outer diameter of the filter having a semi-spherical shape or the like is substantially the same as the inner diameter of the diffuser portion, particularly, when the filter having a semi-spherical shape or the like is fitted into the diffuser portion from the opening portion, it is difficult to fit the same as it is. However, if the outer diameter of the extension portion provided at the peripheral edge of the opening portion of the filter is made smaller as it extends from the peripheral edge of the opening portion of the filter, the diffuser portion is fitted easily. In this case, it is unnecessary to provide holes in the extension portion of the filter.

In the above-described invention, such a constitution can be employed that a combustion chamber accommodating a solid gas generating agent which generates a combustion gas is provided in the inflator housing is provided and a second rupturable plate closes between the combustion chamber and a space in which the pressurized gas is charged, and such a constitution can further be employed that the combustion chamber is provided at an end portion of the inflator housing and an igniter is arranged in the combustion chamber.

In each of the above-described inventions, such a constitution can be employed that many openings are formed in the screen and a flow amount of the pressurized gas is adjusted by these openings.

The invention described in claim 13 provides, as another means for solving the above problem, a filter for an inflator used in an inflator for using a pressurized gas to inflate a body to be inflated and preventing foreign matters from entering the body to be inflated, wherein the filter comprises a porous flat plate except for a wire mesh, and a surface of the filter facing a pressurized gas flow has a concave portion and a convex portion. The concave portion and the convex portion may be formed in a groove(s) or an independent projection(s).

Such a filter can prevent foreign matters, such as fragments produced by rupture of the rupturable plate, from entering the body to be inflated such as an air bag or the like, and it functions to keep a flow amount of the pressurized gas stable as in the case of each of the above-described inventions when the inflator is used.

The invention described in claim 14 provides, as another means for solving the above-described problem, an inflator comprising an inflator housing which has an opening portion and is charged with a pressurized gas, a diffuser portion which is provided in the opening portion side of the inflator housing and has a gas discharging port for discharging outside a pressurized gas flowing from the opening portion at activation, and a first rupturable plate closing a pressurized gas flow path between the diffuser portion and the gas discharging port, wherein a filter is provided in a gas flow path inside the diffuser portion, the filter is formed in a cap-like shape having one end portion closed and the other end portion opened, plural communication holes are formed in a side wall portion of the filter apart from the opened end portion of the filter, and the filter is disposed such that the closed end portion of the filter is directed to the first rupturable plate and the end portion of the filter on the opened side contacts with a wall portion provided with the gas discharging port.

As described above, by forming the filter in a cap-like shape to have plural communication holes at its portion far from the opened end portion and disposing the filter such that the opened end portion thereof contacts with the wall portion provided with the gas discharging port, a pocket portion is formed between the side wall surface of the filter and an inner wall surface of the gas passage. Since the pocket portion exists in a direction of flow of a gas discharged from the opening portion of the inflator housing, fragments of the rupturable plate included in the gas discharged are stored in the pocket portion. Thereby, the fragments of the rupturable plate are arrested in the pocket portion and the fragments is not discharged outside the inflator. Further, the plural communication holes are formed in the side wall surface of the filter and the gas discharged from the opening portion of the inflator housing reaches the gas discharging port through the communication holes, and thereby, the degree of detour of a gas is increased and more (or smaller) fragments of the rupturable plate can be arrested in the pocket portion.

In the inflator described in claim 14, the filter has a principal function for forming a pocket portion between the side wall portion and an inner wall surface defining a gas flow path in the diffuser portion. That is, the side wall portion of the filter is provided with the plural communication holes at a certain distance from the opened end portion, but the depth of the pocket portion corresponds to that certain distance. Therefore, the depth of the pocket portion can be adjusted by adjusting the position of the communication holes. Since a pressurized gas or a combustion gas (a gas generated by combustion of the solid gas generating agent) once flows along the depth direction of the pocket portion, fragments of the rupturable plate or combustion residue included the gases is easily stored in the pocket portion. Further, because of the communication holes formed in the side wall surface of the filter, the direction of the gas once flowing along the depth direction of the pocket portion is changed largely. At this time, fragments of the rupturable plate or combustion residues become easy to be stored in the pocket portion.

That is, as described above, in the inflator in which the pocket portion is formed by the filter, a flow direction of a gas is changed by the filter and fragments of the rupturable plate or the like included in a gas can be stored in the pocket portion, the filter surface is not covered with the fragments and the flow path for the pressurized gas is always secured, because the pocket portion collects fragments of the rupturable plate or the like, so that the an inflator in which a flow amount is kept constant is realized. In addition thereto, if opening areas of the plural communication holes formed in the filter are large enough not to disturb passing-through of the pressurized gas in the housing and the combustion gas, the filter may have a filtering function.

Incidentally, when the filter is formed in a cap-like shape, the entire shape may be made cylindrical, or alternatively, its outer configuration may be formed in various prisms such as a square prism.

Further, according to the above-described invention, by welding and fixing the filter to a wall portion having a gas discharging port of the diffuser portion, fixation of the filter may be facilitated. In view of welding easiness, it is preferable that this welding is resistance-welding.

The filter can be also formed with an expanded portion obtained by further expanding the side wall portion in the opened side. The expanded portion may be formed, for example, in an outward flange shape or it may be formed in a skirt shape expanded gradually outwardly toward the opening end portion of the filter. By forming such an expanded portion, the filter can be prevented from moving in a flow direction of a gas with receiving a pressure of the gas. For example, when a distal end of the expanded portion abuts on an inner wall surface (a wall defining the gas flow path) of the diffuser portion and is fitted into the inner wall, the filter can securely be blocked from moving due to the flow of a gas. In particular, by forming communication holes at a portion of the side wall portion other than the expanded portion, the pocket portion can be formed deeper, and even more fragments and smaller fragments can be captured. Therefore, it is preferable that the expanded portion is formed to gradually expand in a skirt shape.

Further, the invention described in claim 19 provides, as another means for solving the above-described problem, an inflator comprising an inflator housing which has an opening portion and is charged with a pressurized gas, a diffuser portion which is provided in the opening portion side of the inflator housing and has a gas discharging port for discharging outside a pressurized gas flowing from the opening portion at activation, and a first rupturable plate closing a pressurized gas flow path between the diffuser portion and the gas discharging port, wherein a filter is provided in a gas flow path inside the diffuser portion, the filter is formed in a cap-like shape having one end portion closed and the other end portion opened, plural communication holes are formed in a side wall portion of the filter apart from the closed end portion of the filter, and an expanded portion is formed by further expanding the opened side of the filter outwardly and the filter is arranged such that the opened end portion is directed to the first rupturable plate and the expanded portion is fitted to a step portion provided in the diffuser portion.

As described above, the filter is formed into a cap-like shape to have plural communication holes at a portion apart from the closed end portion, is provided with the expanded portion in the opened side, and has the expanded portion fitted into the step portion provided in the diffuser portion in such a state that the end portion of the filter on the opened side is directed to the first rupturable plate, and consequently, the pocket portion is formed at the closed end portion in the filter.

Since the pocket portion exists in a flow direction of a gas discharged from the opening portion of the inflator housing, fragments of the rupturable plate included in a discharged gas or combustion residues generated by combustion of the solid gas generating agent are stored in the pocket portion. Thereby, the fragments of the rupturable plate are collected at the pocket portion and the fragments of the rupturable plate are not discharged outside the inflator.

As described above, even in the inflator described in claim 19, the filter has a principal function for forming the pocket portion. That is, the side wall portion of the filter is provided with the plural communication holes at a certain distance from the closed end portion, but the depth of the pocket portion corresponds to that certain distance. Therefore, the depth of the pocket portion can be adjusted by adjusting the position of the communication holes. A pressurized gas or a combustion gas once flows along the depth direction of the pocket portion and then changes its direction largely, so that at this time, fragments of the rupturable plate or combustion residues are left in the pocket portion That is, as described above, in the inflator in which the pocket portion is formed by the filter, a flow direction of a gas is changed by the filter and fragments of the rupturable plate or the like included in a gas can be stored in the pocket portion, the filter surface is not covered with the fragments and the flow path for the pressurized gas is always secured, because the pocket portion collects fragments of the rupturable plate or the like, so that the an inflator in which a flow amount is kept constant is realized.

In addition, if opening areas of the plural communication holes in the filter are large enough not to disturb passing-through of the pressurized gas in the housing and the combustion gas, the filter may have a filtering function.

Incidentally, when the filter is formed in a cap-like shape, the entire shape may be made cylindrical, or alternatively, its outer configuration may be formed in various prisms such as a square prism. Particularly, in this invention, preferably, the expanded portion is formed into a outward flange-like shape.

In the above-described invention, a continuous projection can be formed on a wall surface having the gas discharging port inside the diffuser portion. With this projection, grooves appearing between the projection and an inner surface of the side wall portion or between the projections also serve as a pocket portion for storing fragments of the rupturable plate, thereby securely arresting fragments of the rupturable plate. In particular, it is desirable that a projection formed inside the wall surface having the gas discharging port (namely, inside the diffuser portion) is formed as an annular projection for surrounding the gas discharging port, and it is desirable that the projection is formed in multiple circles such as double circles or triple circles. In order to use the groove formed by the projections as the pocket portion effectively, desirably, the groove exists in the course of a gas which has changes the flow direction after being discharged radially from the communication holes of the filter and striking against an inner surface of the side wall of the diffuser portion. In other words, desirably, the groove exists in a direction in which a gas directly flows after it strikes against the inner surface of the side wall in the diffuser portion and changes its flow direction.

By press-fitting the expanded portion into the step portion provided inside the diffuser portion or welding the former to the latter, the filter can be fixed easily. As a welding, a resistance-welding is particularly preferable in view of easiness in performing a welding.

Incidentally, the pocket portion or the groove in the present invention collects not only fragments of the rupturable plate but also combustion residues generated by combustion of a solid gas generating agent when the solid gas generating agent is contained in the inflator.

According to the inflator of the present invention, since the flow amount of the pressurized gas can be kept approximately constant, a stable operation performance can be obtained, and reliability of a product can be improved.

EXPLANATION OF NUMERALS 10, 110 inflator
12, 112 inflator housing
16, 116 diffuser portion
20, 120 filter
22, 122 first rupturable plate
24, 124 combustion chamber
25, 125 gas generating agent
28, 128 igniter 140 pocket portion
141 gas discharging port
142 closed portion
143 opened portion
144 pressurized gas flow path
145 peripheral wall portion
146 wall
147 communication hole
148 expanded portion

PREFERRED EMBODIMENT OF THE INVENTION

Embodiments of the present invention will be explained with reference to the drawings. FIG. 1 is shown as an inflator of a conventional art, which is different only in shape, structure or arrangement of a filter 20 from an inflator of the present invention, so that an inflator 10 of the present invention will be generally explained with reference to FIG. 1.

An opening portion 13 is provided at one end of a cylindrical inflator housing 12, and the opening portion 13 is closed by a first rupturable plate 22. The first rupturable plate 22 is fixed to the inflator housing 12 or a diffuser portion 16 by resistance-welding or the like.

A pressurized gas such as argon, helium, or nitrogen gas is charged in an internal space 14 of the inflator housing 12. A charging pressure of the pressurized medium is about 20,000 to 65,000 kPa.

The diffuser portion 16 having a gas discharging port 18 is connected to the opening portion 13, a filter 20 is provided in a pressurized gas flow path 15 provided between the gas discharging port 18 and the first rupturable plate 22, and the pressurized gas flow path 15 is closed before activation.

The inflator housing 12 and the diffuser portion 16 may be formed as different members or they may be formed as a single member.

A combustion chamber 24 surrounded by a combustion chamber housing 26 is provided at the other end of the cylindrical inflator housing 12, and a required amount of solid gas generating agent 25 is accommodated in the combustion chamber 24. An igniter 28 for igniting and burning the gas generating agent 25 is provided in the combustion chamber 24.

A combustion gas flow path 32, which makes the combustion chamber 24 communicate with the internal space 14 charged with a pressurized gas, is closed by a second rupturable plate 30. The second rupturable plate 30 is fixed to the combustion chamber housing 26 by resistance-welding or the like.

Next, embodiments of the filters 20 used in the inflator 10 of the present invention will be explained with reference to FIGS. 2 (a) to (f). FIGS. 2 (a) to (e) are respectively axial sectional views of one portion including a filter, and FIG. 2 (f) are an axial sectional view of one portion including the filter, and a plan view of the filter. Incidentally, each of the filters 20 shown in FIG. 2 (a) to (f) is made of stainless steel and is formed by working and deforming a flat plate having a required number of holes (for example, 5 to 25 holes per 1 cm$^2$).

A filter 20 shown in FIG. 2 (a) has a convex portions 41, 42 and a concave portion 43 on a surface thereof in the first rupturable plate 22 side. Since the convex portion 42 is an annular projection, the concave portion 43 forms an annular groove. The convex portion 41 is a single independent projection.

Figure 2A:
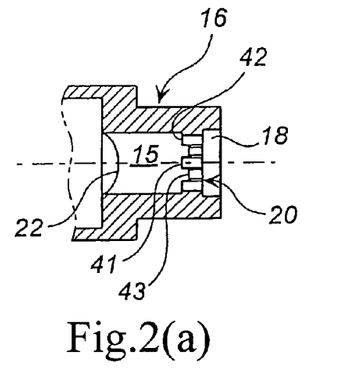
FIG. 2 is an axial sectional view of a portion including a filter arranged in the inflator.
Figure 2B:
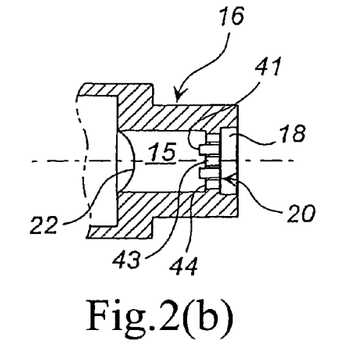

A filter 20 shown in FIG. 2(b) has a convex portion 41, and concave portions 43, 44 on a surface thereof in the first rupturable plate 22 side. Since the convex portion 41 is an annular projection, the concave portion 44 forms an annular groove. The concave portion 43 is a single independent recess.

Figure 2C:
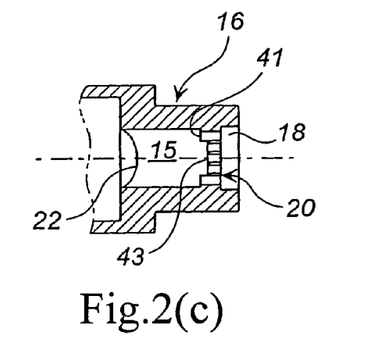
Figure 2D:
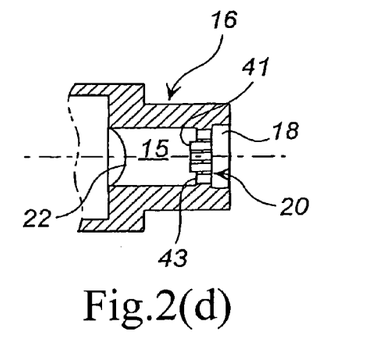
Figure 2E:
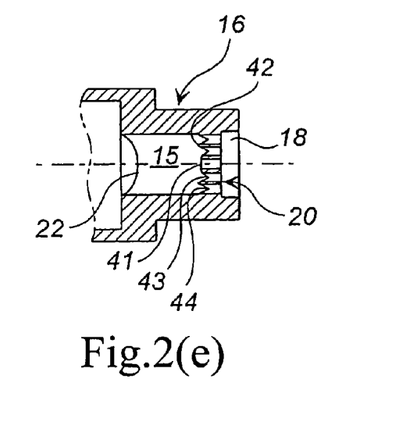
Figure 2F:
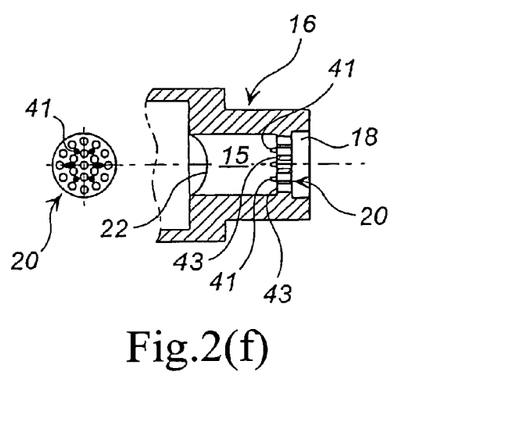

A filter 20 shown in FIG. 2(c) has a convex portion 41 and a concave portion 43 on a surface thereof in the first rupturable plate 22 side. Since the convex portion 41 is an annular projection, the concave portion 43 forms a single independent recess.

A filter 20 shown in FIG. 2 (d) has a convex portion 41 and a concave portion 43 on a surface thereof in the first rupturable plate 22 side. Since the convex portion 41 is a cylindrical projection, the concave portion 43 forms an annular groove surrounding the projection 41.

A filter 20 shown in FIG. 2 (e) has convex portions 41, 42 and concave portions 43, 44 on a surface thereof in the first rupturable plate 22 side. Since the convex portion 41 is a cylindrical projection and the convex portion 42 is an annular projection, the concave portion 43 forms an annular groove interposing between the convex portions 41 and 42, and the concave portion 44 forms an annular groove surrounding the convex portion 42.

A filter 20 shown in FIG. 2 (f) has plural convex portions 41 on a surface thereof and the concave portion 43 on the remaining surface in the first rupturable plate 22 side. The projections 41 are respectively independent projections, as shown with the plan view.

By using each of the above-described filters 20 shown in FIG. 2 (a) to (f), when fragments of the first rupturable plate 22 or the like touch the filter 20, holes in the filter 20 are hardly blocked, as compared with a flat plate-shaped filter which has no concave portion and convex portion. And, even if some of holes are blocked, the pressurized gas flow path can be secured by the remaining holes. Further, many holes formed in the filter 20 are not blocked, so that it is made easy to adjust a flow amount of the pressurized gas by the many holes.

Figure 3A:
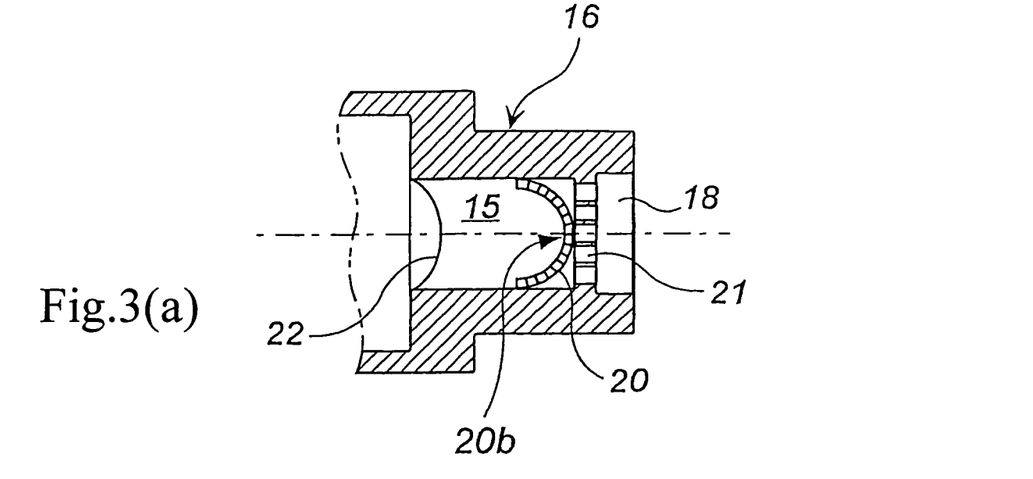
FIG. 3(a) is an axial sectional view of a portion including a filter arranged in the inflator taken along the direction thereof, (b) is a sectional view of a filter of another embodiment, and (c) is a sectional view of a filter of another embodiment.
Figure 3B:
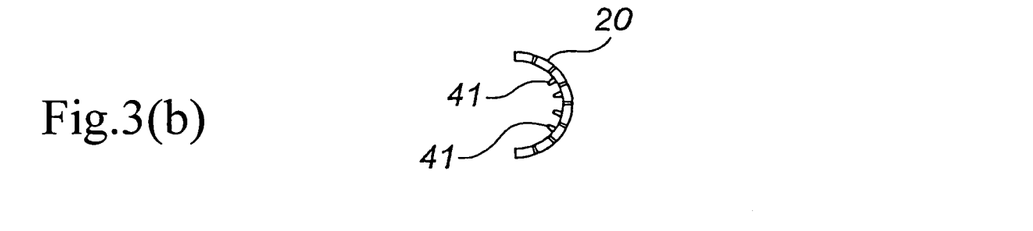
Figure 3C:
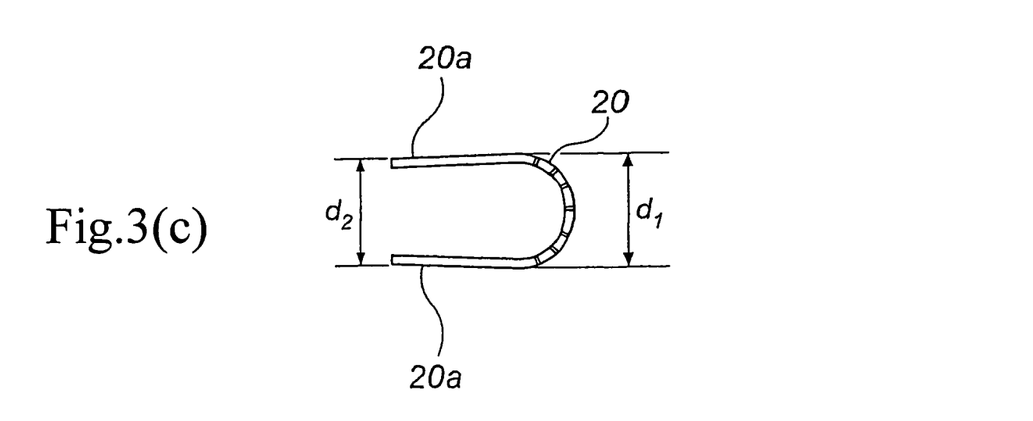

Next, other embodiments of the filter 20 used in the filter 10 will be explained with reference to FIGS. 3 (a) to (c). FIG. 3 (a) is an axial sectional view of one portion including a filter, FIG. 3(b) is a sectional view of a filter of another embodiment, and FIG. 3(c) is a sectional view of a filter of another embodiment. Incidentally, filters 20 shown in FIGS. 3 (a) to (c) are made of stainless steel, and have a semi-spherical shape or a shape similar thereto with a required number of holes (for example, 10 to 20 holes per 1 cm² with a flat plate conversion).

In the inflator 10 shown in FIG. 3(a), a screen 21 and a filter 20 are arranged in a pressurized gas flow path 15 inside the diffuser portion 16 in a state that they are in contact with each other. The screen 21 comprises a wire mesh made of stainless steel and it is fixed to an inner wall surface of the diffuser portion 16 by welding or the like.

The filter 20 is arranged in a state that its opening portion is directed to the first rupturable plate 22 side and its spherical surface is in contact with the screen 21. The filter 20 is fitted into the pressurized flow path 15 before mounting the screen 21 and it is not fixed yet.

FIG. 3(b) shows a semi-spherical filter 20 shown in FIG. 3(a) provided at its inner surface with a required number of projections 41. The projection may be arranged as shown in FIGS. 2 (a) to (f), and, for example, it may be formed in an annular projection such as the convex portion 41 in FIG. 2 (b), or it may be formed in plural independent projections as the projections 41 in FIG. 2(f).

The semi-spherical filter 20 shown in FIGS. 3 (a) and (b) has an extension portion 20a in which a peripheral edge of the opening portion is extended, as shown in FIG. 3 (c), and an outer diameter d2 of the extension portion 20a may be smaller than an outer diameter d1 of the filter 20. Incidentally, an inner diameter of the pressurized gas flow path 15 is approximately equal to the diameter d1 of the filter 20.

By providing the filter 20 with such an extension portion 20a as shown in FIG. 3(c), a work for fitting the filter 20 into the pressurized gas flow path 15 in the diffuser portion 16 before mounting the screen 21 can be facilitated, even from the screen 21 side or even from the opening portion side of the filter 20. In particular, in case of fitting the filter 20 from the screen 21 side, the above relationship between the outer diameter d1 of the filter 20 and the outer diameter d2 of the extension portion 20a is preferable, because fitting is made easy.

By using the above-described filters 20 shown in FIGS. 3 (a) to (c), when fragments of the first rupturable plate 22 or the like touches the filter 20, holes in the filter 20 are hardly blocked, as compared with a flat plate-shaped filter which has no concave portion and convex portion, and even if some of holes are blocked, a pressurized gas flow path can be secured by the remaining holes. In particular, as shown in FIG. 3 (a), the fragments are collected in the vicinity of a top 20b of the inner surface in the filter 20 and the remaining portion of the inner surface is not in contact with fragments at this time, thereby, a flow path for the pressurized gas can be obtained more easily. Further, since the many holes formed in the filter 20 are not blocked, adjustment of a flow amount of the pressurized gas conducted by the many holes is made easy.

Figure 4A:
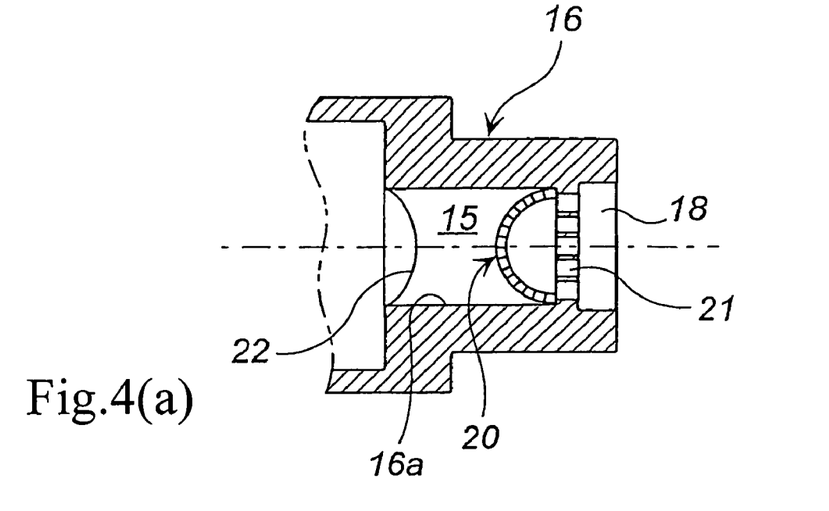
FIG. 4(a) is an axial sectional view of a portion including a filter arranged in the inflator, (b) is a sectional view of a filter of another embodiment, and (c) is an explanatory view for mounting a filter of another embodiment.
Figure 4B:
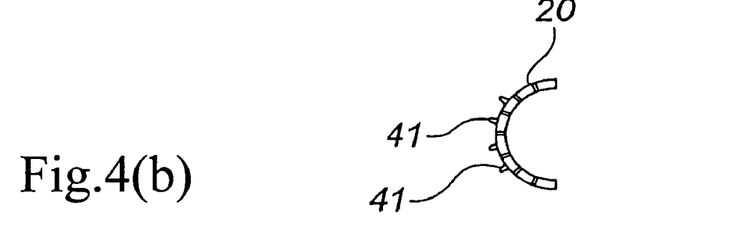
Figure 4C:
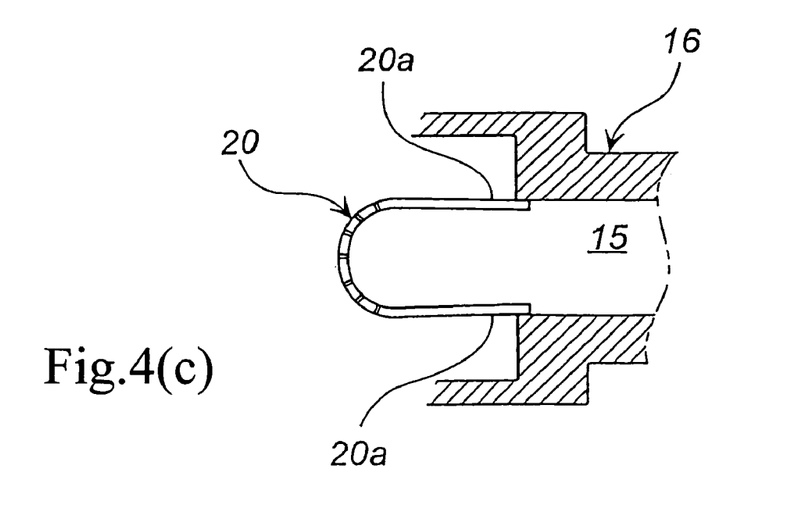

Next, other embodiments of the filter 20 used in the inflator 10 will be explained with reference to FIGS. 4 (a) to (c). FIG. 4(a) is an axial sectional view of one portion including a filter, FIG. 4(b) is a sectional view of a filter of another embodiment, and FIG. 4(c) is a sectional view for explaining a method of mounting a filter of another embodiment. Incidentally, the filters 20 shown in FIGS. 4 (a) to (c) are made of stainless steel and have a semi-spherical shape or a shape similar thereto with a required number of holes (for example, 10 to 20 holes per 1 cm² if converted into a flat plate).

In the inflator 10 shown in FIG. 4(a), a screen 21 and a filter 20 are arranged to be in contact with each other in a pressurized gas flow path 15 inside the diffuser portion 16. The screen 21 comprises a wire mesh made of stainless steel and it is fixed to an inner wall surface of the diffuser portion 16 by welding or the like.

The filter 20 is arranged in such a state that its spherical surface is directed to the first rupturable plate 22 side and its peripheral edge of the opening portion is in contact with screen 21. The filter 20 has been fitted into the pressurized flow path 15 before mounting the first rupturable plate 22 and it is not fixed yet.

FIG. 4(b) shows a filter 20 formed by providing an outer surface of the semi-spherical filter 20 shown in FIG. 4(a) with a required number of projections 41. The projection may be arranged as shown in FIGS. 2 (a) to (f), and, for example, it may be formed in an annular projection such as the convex portion 41 in FIG. 2(b), or it may be formed in plural independent projections as the projections 41 in FIG. 2(f).

The semi-spherical filter 20 shown in FIGS. 4(a) and (b) has an extension portion 20a in which a peripheral edge of an opening portion is extended, as shown in FIG. 4(c), and an outer diameter of the extension portion 20a may be smaller than an outer diameter of the filter 20 as in the case of FIG. 3 (*c*) By providing the filter 20 with an extension portion 20*a*, a work for fitting the filter 20 into the pressurized gas flow path 15 in the diffuser portion 16 before mounting the first rupturable plate 22 can be facilitated, even from the first rupturable plate 22 side or even from the opening portion of the filter 20 side. Particularly, in case of fitting the filter 20 from the first rupturable plate 22 side, such a filter 20, which satisfies the same relationship as that between the outer diameter d1 of the filter 20 and the outer diameter d2 of the extension portion 20*a* shown in FIG. 3(*c*), is preferable, because fitting is made easy.

By using each of the above-described filters shown in FIGS. 4 (*a*) to (*c*), when fragments of the first rupturable plate 22 or the like touches the filter 20, the holes in the filter 20 are hardly blocked, as compared with a flat plate-shaped filter which has no concave portion and convex portion, and even if some of holes are blocked, a pressurized gas flow path can be secured by the remaining holes. In particular, as shown in FIG. 4 (*a*), the fragments are collected in the vicinity of a portion where an outer surface of the filter 20 and an inner wall surface 16*a* of the diffuser portion 16 come in contact with each other and a portion around a top of the filter is not in contact with fragments at this time, and thereby securing of a flow path for the pressurized gas is made easier. Further, since many holes formed in the filter 20 are not blocked, adjustment of a flow amount of the pressurized gas conducted by many holes is made easy.

Incidentally, in the inflator 10 shown in FIG. 1, at one end portion of the housing 12 which is long axially, the opening portion 13 and the diffuser portion 16 are formed to be concentric with the center axis of the housing 12, but, for example, the opening portion 13 and the diffuser portion 16 may be formed to be eccentric with the center axis of the housing 12 at one end portion of the housing 12, or the opening portion 13 or the diffuser portion 16 may be formed in the peripheral wall portion of the housing 12. Further, a shape of the housing 12 is not limited to that shown in FIG. 1 but it may be long in the radial direction.

Next, an operation of an embodiment in which, as a filter 20, the filter 20 shown in FIG. 3(*a*) is mounted to the inflator 10 in FIG. 1 will be explained.

At the time of being mounted to the vehicle, the inflator 10 is mounted as a system, being combined with an activation signal-outputting means comprising an impact sensor and a control unit and a module case or the like accommodating the inflator 10 and an air bag (for example, a curtain-like air bag) therein. The air bag is connected at an outer peripheral surface of the diffuser portion 16 in the gas discharging port 18 side.

Upon receiving a signal from the impact sensor in the above system when the vehicle receives an impact, the igniter 28 is activated, and a priming is ignited and burnt to ignite and burn the gas generating agent 25 in the combustion chamber 24, so that a combustion gas with a high temperature is generated.

The second rupturable plate 30 is ruptured due to generation of the combustion gas, and the combustion gas flows into the internal space 14 through the combustion gas flow path 32 to increase a pressure. Since the first rupturable plate 22 is ruptured due to pressure rising in the internal space 14, so that the opening portion 13 is opened, the pressurized gas flows out from the gas discharging port 22 through the filter 20 to inflate the air bag. In this course, fragments of the first rupturable plate 22 are captured by the filter 20, as described above, and outflow of the pressurized gas is not blocked.

Figure 7:
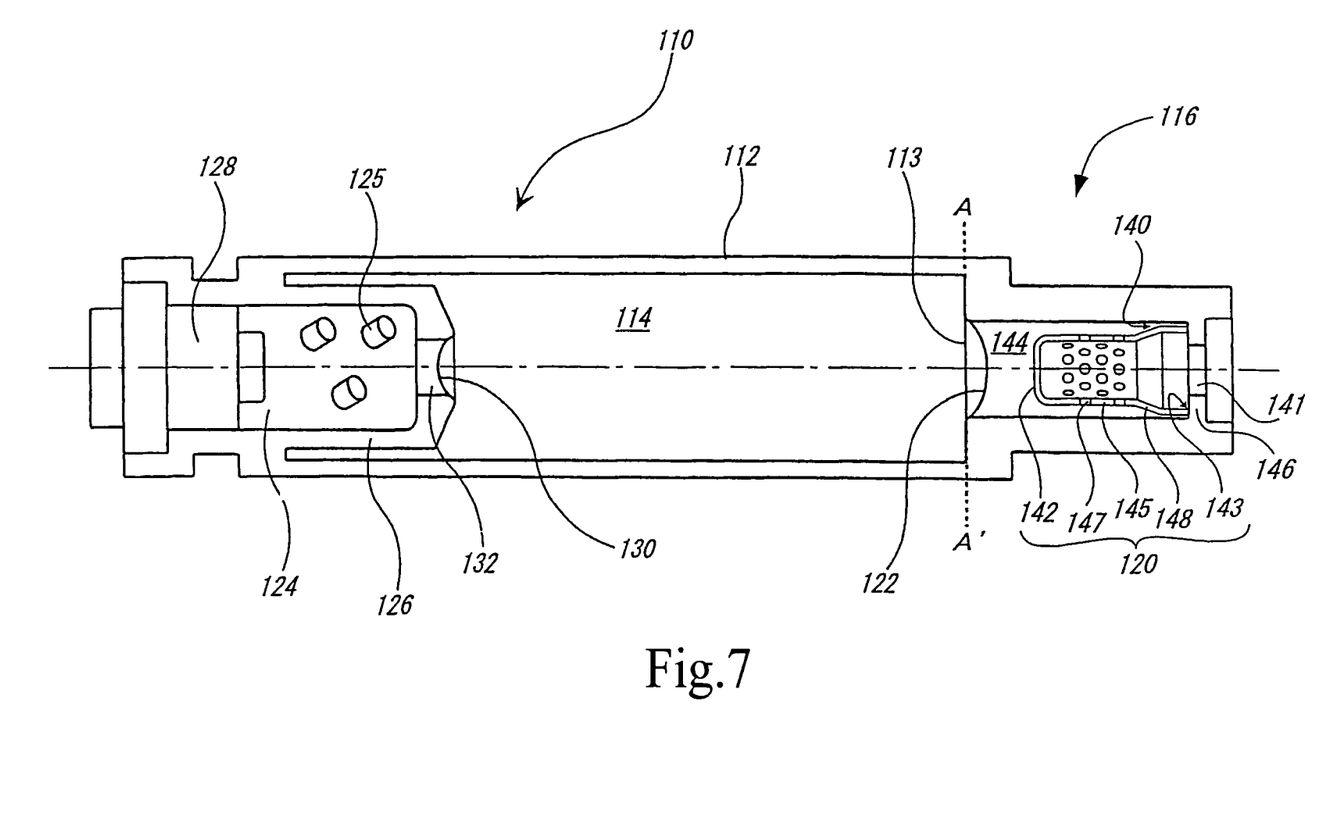
FIG. 7 is an axial sectional view of an inflator in another embodiment.

Next, other embodiments of an inflator 110 and another embodiments of a filter 120 used in the inflator according to the present invention will be explained with reference to FIGS. 7 to 12. FIG. 7 is a sectional view showing an inflator 110 according to the present invention, taken along an axial direction of a housing.

The inflator 110 shown in FIG. 7 is different in shape, structure and arrangement of the filter 120 from the conventional inflator shown in FIG. 1, but the other constitution or structure thereof is substantially the same as that shown in FIG. 1. The inflator 110 will be described generally as follows.

First, in the inflator 110 shown in this embodiment, an opening portion 113 is provided at one end of a cylindrical inflator housing 112, and the opening portion 113 is closed by a first rupturable plate 122. The first rupturable plate 122 is fixed to the inflator housing 112 or a diffuser portion 116 by resistance-welding or the like.

A pressurized gas such as argon, helium, or nitrogen gas is charged in an internal space 114 of the inflator housing 112. A charging pressure of the pressurized medium is about 20,000 to 65,000 kPa.

A combustion chamber 124 surrounded by a combustion chamber housing 126 is provided in the cylindrical inflator housing 112 at an opposite side (hereinafter, referred to as in the other end side) to the side in which the opening portion 113 is provided, and a required amount of solid gas generating agent 125 is accommodated in the combustion chamber 124. An igniter 128 for igniting and burning the gas generating agent 125 is provided inside the combustion chamber 124.

A combustion gas flow path 132 for communicating the combustion chamber 124 with the internal space 114 charged with the pressurized gas is closed by a second rupturable plate 130. The second rupturable plate 130 is fixed to the combustion chamber housing 126 by resistance-welding or the like.

The diffuser portion 116 having a gas discharging port 141 is connected to the opening portion 113 provided in the inflator housing 112. The diffuser portion 116 may be formed integrally with the inflator housing, as shown in the drawing, or alternatively it may be formed as an independent member from the inflator housing, being separated at a certain portion. For example, a diffuser portion 116 can be made as a member independent from the inflator housing 112, being separated along the chain line connecting A–A' portion in FIG. 7 or a portion thereabout.

In this embodiment or the embodiments described later, an amount of a gas to be discharged through the gas discharging port 141 is adjusted. That is, the total opening area of the gas discharging port 141 is smaller than the total opening area of the opening portion 113 or the total opening area of the communication holes 147.

The interior of the diffuser portion 116 is formed to be hollow, a pressurized gas flow path 144 is defined between the gas discharging port 141 and the first rupturable plate 22, and the pressurized gas flow path 144 is closed before activation of the inflator.

A filter 120 is provided in the interior of the pressurized gas flow path 144. The filter 120 shown in this embodiment is formed in a substantially cylindrical shape as a whole and in a cap shape having an axial one end portion closed and the other end portion opened, and the closed one end portion is defined as a closed portion 142 and the opened end portion opposite thereto is defined as an opened portion 143. In a side wall portion (namely, a peripheral wall portion 145) of the filter 120 formed in the substantially cylindrical cap shape, plural communication holes 147 are provided in a range of the side wall portion spaced from an end portion in the opening side (namely, the opened portion 143). Further, the filter 120 shown in this embodiment is formed with an expanded portion 148 obtained by expanding the peripheral wall portion 145 on the side of the opening portion 143 in the radial direction so as to increase the diameter thereof.

The filter 120 is mounted by abutting a distal end (namely, the opened portion 143) of the expanded portion 148 against the wall 146 provided with the gas discharging port 141 to weld the distal end to the wall. In the case of welding, it is desirable that fixation is conducted by resistance welding, because the fixation is easily performed. In particular, when the diffuser portion 116 and the inflator housing 112 are formed as an independent member, being separated along the chain line connecting the A–A' portion in FIG. 7 or a portion thereabout, as described above, it is desirable that the filter 120 is arranged in the gas flow path 144 from the side in which the opening portion 113 is formed such that the opened portion 143 is directed to the gas discharging port 141 and the expanded portion 148 and the wall 146 are fixed to each other by resistance-welding.

In the filter 120 shown in this figure, the communication holes 147 are formed in the portion other than the expanded portion 148 in a peripheral portion 145. Therefore, when the filter 120 is disposed in the gas flow path 144, a pocket portion 140 which can store fragments of the rupturable plate is formed between the an outer peripheral surface of the expanded portion 148 and an inner surface (namely, a surface defining a radial outer surface of the gas flow path 144) of the diffuser portion 116. Further, since no communication hole 147 is formed in the expanded portion 148, the pocket portion 140 with a depth corresponding to the length of the expanded portion 148 in its axial direction thereof is formed.

When the inflator shown in FIG. 7 is activated, fragments of the first rupturable plate 122 is contained in a gas flowed into the diffuser portion 116. However, since a gas flowing in the axial direction of the housing 112 (the diffuser portion 116) passes through the communication holes 147 after its flow direction is changed largely (by about 90°) at a position where the communication holes 147 of the filter 120 are formed, fragments are easily stored in the pocket portion 140. At that time, since not only the first rupturable plate 122 but also the second rupturable plate 130 or combustion residues generated by combustion of the gas generating agent 125 are stored in the pocket portion, an amount of fragments and the combustion residue discharged outside the housing 112 is reduced. Further, since the fragments of the rupturable plate or the like are stored in the pocket portion and a surface (particularly, the communication holes 147) of the filter is not covered with the fragments or the like, a flow path for the pressurized gas is always secured so that an inflator in which a flow amount is not changed is realized.

In particular, when the communication holes 147 are formed at such a position that part of the holes are not blocked by fragments stored in the pocket portion 140, more preferable effect can be obtained.

Next, still other embodiments of the filter 20 used in the inflator 10 will be explained with reference to FIGS. 8 to 11. FIGS. 8 to 11 are respectively axial sectional views of one portions including a filter in an inflator, which shows states, particularly, at a time of activation, namely after the rupturable plate 122 has been ruptured. A thick arrow line in each drawing indicates a flow direction of a gas. The same members as those in FIG. 7 are attached with same numerals and explanation thereof will be omitted.

Figure 8:
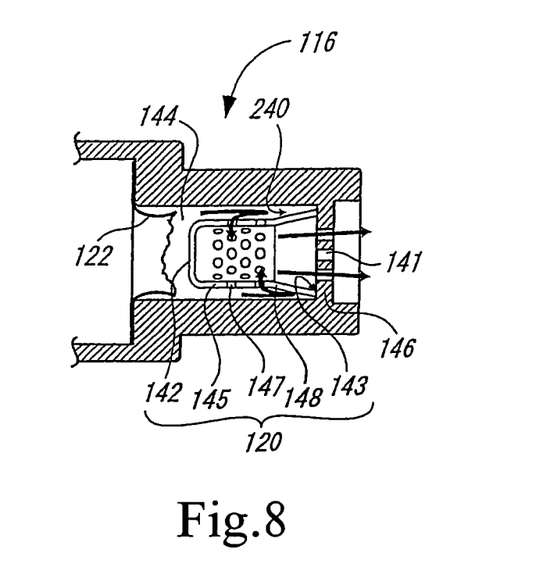
FIG. 8 is an axial sectional view of a portion including a filter of another embodiment.

In an inflator shown in FIG. 8, a filter 120 constituted to include an expanded portion 148 is used, and particularly, the filter 120 is formed in a skirt shape having an inclining portion whose diameter is gradually increased. When the filter 120 shown in FIG. 8 is used, an outer diameter of the distal end (namely, the opened portion 143) of the expanded portion 148 is made slightly smaller than an inner diameter of the gas flow path 144 of a portion in which the opened portion 143 exists, so that positioning can be performed when the filter is disposed in the gas flow path 144.

In FIG. 8, a gas discharging port 141 formed in the diffuser portion 116 is formed to comprise plural small holes, but the gas discharging port 141 may be formed as a single opening in the same manner as the inflator shown in FIG. 7 described above. The filter 120 is fixed by directing the closed portion 142 to the rupturable plate 122 side and resistance-welding a distal end (the opened portion 143) of the expanded portion 148 to a wall 146 provided with the gas discharging port 141.

Even in the inflator shown in FIG. 8, since a pocket portion 140 which can store fragments of the rupturable plate is formed between an outer peripheral surface of the expanded portion 148 and an inner peripheral surface (that is, a surface defining a radial outside of the gas flow path 144) of the diffuser portion 116, fragments or the like included in the gas are stored in the pocket portion 140 and are removed from the gas. Therefore, a surface of the filter is not covered with the fragments or the like, a flow path for the pressurized gas is always secured so that an inflator having a constant flow amount is realized.

Further, since the communication holes 147 are formed in the peripheral portion 145 but not in the expanded portion 148, the pocket portion 140 with a depth corresponding to the axial length of the expanded portion 148 is formed.

Figure 9:
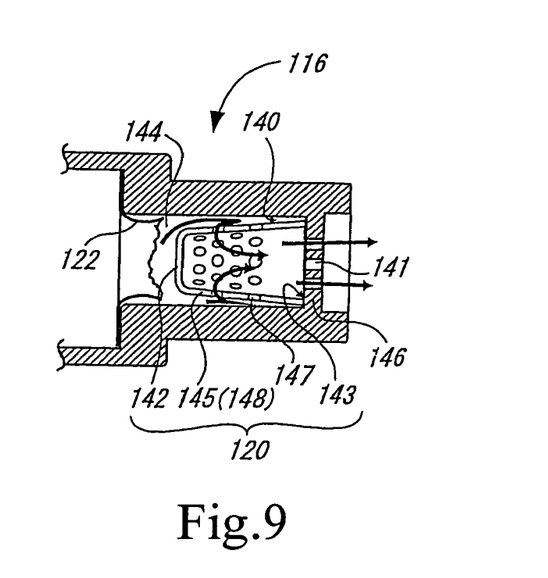
FIG. 9 is an axial sectional view of a portion including a filter of still another embodiment.

In relation to the inflator shown in FIG. 8, as shown in FIG. 9, an inflator 120 in which the whole of the peripheral wall portion 145 corresponds to the expanded portion 148 can be used. Even in this case, by forming an outer diameter of an end portion of the opened portion 143 to be slightly smaller than an inner diameter of the gas flow path 144 in a portion where the opened portion 143 exists, positioning at a time of assembling the filter 120 can be performed easily.

In particular, as shown in FIG. 9, when the whole of the peripheral wall portion 145 of the filter 120 is formed as the expanded portion 148, the communication holes 147 are necessarily provided in the peripheral wall portion 145 formed as the expanded portion 148, but they are formed in a portion far from the opened portion 143. Therefore, a pocket portion 140 which can store fragments of the rupturable plate therein is formed between an outer peripheral surface of the expanded portion 148 and an inner peripheral surface of the diffuser portion 116 in the vicinity of the opened portion 143. Thereby, due to that fragments or the like included in the gas are stored in the pocket portion 140 to be removed from the gas, and a flow path for the pressurized gas is always secured so that an inflator in which a flow amount is constant is realized.

Figure 10:
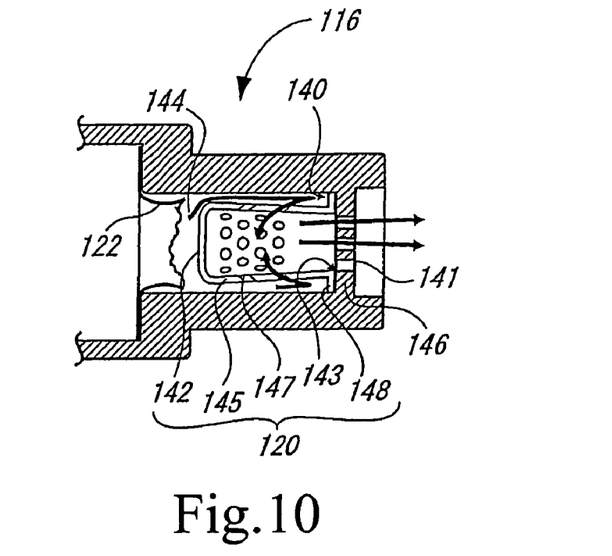
FIG. 10 is an axial sectional view of a portion including a filter of still another embodiment.

Further, the expanded portion can be formed in an outward flange-like shape, as show in FIG. 10. That is, a filter 120 used in the inflator shown in FIG. 10 has such a structure that its peripheral wall portion 145 is reduced in diameter toward the opened portion 143 and an expanded portion 148 extending outwardly in the radial direction is formed at an end portion of the opened portion 143. The expanded portion 148 is formed in an outward flange shape, and therefore, if its outer diameter is formed to be slightly smaller than an inner diameter of the gas flow path 144 in a portion where the expanded portion 148 exits, positioning at a time of assembling the filter 120 into the gas flow path 144 can be made easily.

The filter 120 is fixed by resistance-welding a portion of the flat expanded portion 148 to a wall 146 provided with the gas discharging port 141.

In particular, as shown in FIG. 10, in the filter 120 in which the peripheral wall portion 145 is reduced in diameter toward the opened portion 143, the communication holes 147 are formed in a portion far from the opened portion 143 of the peripheral wall portion 145 reduced in diameter and the pocket portion 140 is formed between an outer peripheral surface of the peripheral wall portion 145 which is not formed with the communication holes 147 and an inner peripheral surface of the diffuser portion 116. Thereby, fragments included in a gas and the like are stored in the pocket portion 140. As a result, the fragments and the like are removed from the gas and a flow path for the pressurized gas is always secured, so that an inflator in which a flow amount is constant is realized. In particular, in the filter 120 shown in FIG. 10, since the peripheral wall portion 145 is reduced in diameter, the degree of direction change of gas flow when a gas passes through the communication holes 147 becomes large, so that fragments and the residue are stored more easily in the pocket portion 140. Incidentally, in FIG. 10, even if the filter is not reduced in diameter in the opened portion 143 side, fragments and the residue is stored more easily by only changing the direction of the communication holes 147 to a direction shown in FIG. 10.

Figure 11:
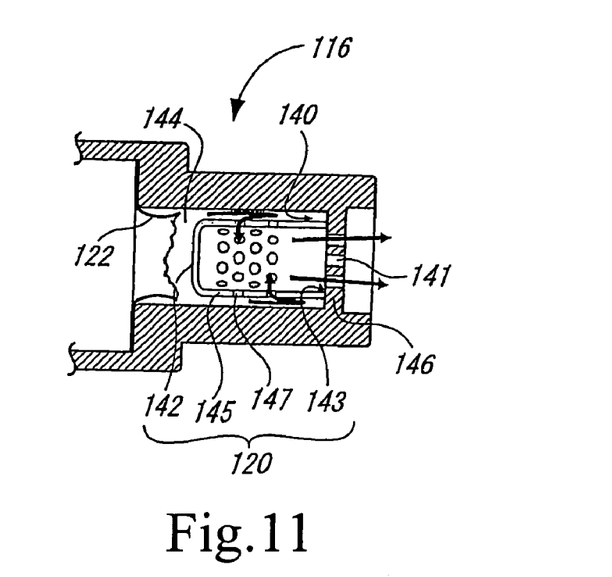
FIG. 11 is an axial sectional view of a portion including a filter of still another embodiment.

FIG. 11 shows an inflator formed with a filter 120 having no expanded portion. The filter 12 is fixed by resistance-welding the distal end of the opened portion 143 to the wall 146 provided with the gas discharging port 141. In the filter 120 shown in FIG. 11, the communication holes 147 are formed in a portion far from the opened portion 143 of the peripheral wall portion 145, and a pocket portion 140 is formed between an outer peripheral surface of the peripheral wall portion 145 in a portion where the communication holes 147 are not provided and an inner peripheral surface of the diffuser portion 116.

When a gas flows in the diffuser portion 116 (namely, in a gas flow path 144) due to rupture of the rupturable plate 122, the gas strikes against a closed portion 142 of the filter 120 and it is guided into the pocket portion 140 directly. Fragments of the rupturable plate and the like are left in the pocket portion 140 and only the gas passes through the communication holes 147 and through the interior of the filter 120 to be discharged from the gas discharging port 141.

Therefore, even in this inflator, since fragments of the rupturable plate and the like are stored in the pocket portion 140 and a surface of the filter is not covered with the fragments and the like, a flow path for the pressurized gas is always secured and an inflator in which a flow amount is constant is realized.

Figure 12:
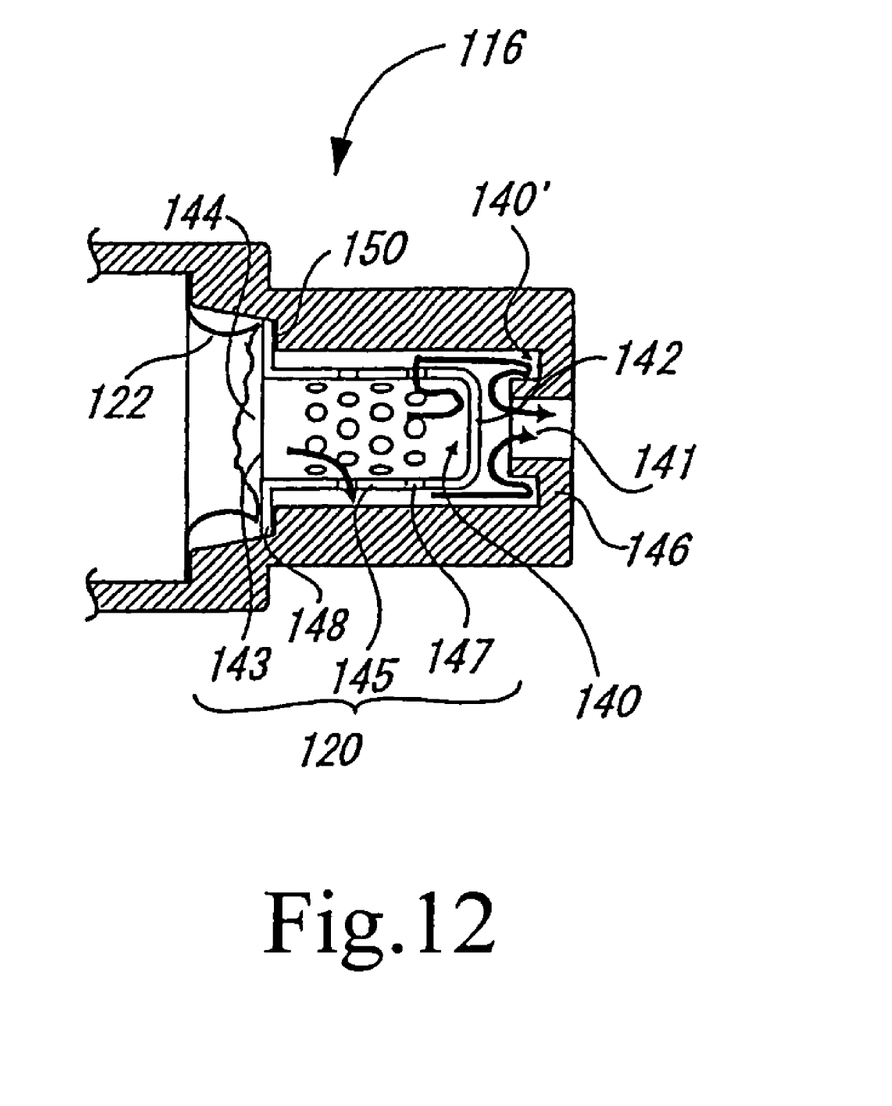
FIG. 12 is an axial sectional view of a portion including a filter of still another embodiment.

Further, FIG. 12 shows an inflator in which an opened portion 143 of the filter 120 is directed to the rupturable plate 122 side and the closed portion 142 is directed to the gas discharging port 141 side.

That is, the filter 120 shown in this drawing is formed at an end portion of the opened portion 143 with an expanded portion 148 extending outwardly in the radial direction, and the filter is fixed by engaging the expanded portion 148 with a step portion 150 formed inside the gas flow path 144. At this time, when the step portion 150 is made substantially equal to an outer shape of the expanded portion 148, the filter 120 can be fixed by pressure-fitting the same into the gas flow path. At a time of this pressure-fitting, the closed portion 142 of the filter 120 is directed to the gas discharging port 141 and the pressure-fitting is performed from the opened portion 143 side. Further, when the step portion 150 is formed to have a periphery which is gradually reduced in inner diameter toward the closed end, namely toward the gas discharging port 141, pressure-fitting of the filter 120 can be performed easily.

In the filter 120 shown in FIG. 12, the communication holes 147 are formed in a portion far from the closed portion 142 of the peripheral wall portion 145, and the pocket portion 140 is provided in the closed portion 142 side inside the filter 120. Thereby, when a gas flows in the diffuser portion 116 (namely, in the gas flow path 144) due to rupture of the rupturable plate 122, the gas flows toward the closed portion 142 inside the filter 120. However, the flow direction of the gas changes largely at a position where the communication holes 147 are formed and the gas flows outwardly in the radial direction. At this time, since fragments, residues and the like in the gas flow toward the closed portion 142 directly, they are stored in the pocket portion 140. Thereby, the gas from which the fragments and the like are removed flows outside the filter 120 through the communication holes 147.

Further, as shown in FIG. 12, a continuous projection is formed on the wall surface 146 having the gas discharging port 141 inside the diffuser portion 116, so that a second pocket portion 140' can be defined between the projection and an inner wall surface of the diffuser portion. The second pocket portion is formed annularly outside the projection surrounding the gas discharging port 141.

Therefore, in the inflator shown in FIG. 12, the direction of a gas discharged from the filter 120 is further changed largely at the second pocket portion 140', so that fragments and residues are further arrested in the second pocket portion 140'.

Incidentally, in this embodiment, the inflator including the solid gas generating agent has been described, but the present invention can be applied to a structure in which fragments of a rupturable plate are arrested in an inflator (for example, an inflator in which a rupturable plate is ruptured by an activation output of an electrical igniter) including only a pressurized gas as a gas generating source and having an opening portion closed by a rupturable plate.

The inflator of the present invention can be employed as various inflators such as an inflator for a driver side, an inflator for a passenger side next to the driver, an air bag inflator for a side collision, an inflator for a curtain air bag, an inflator for a knee-bolster air bag, an inflator for an inflatable seat belt, an inflator for a tubular system and an inflator for a pretensioner, and the filter for an inflator of the present invention can be applied to the above-described various inflators.

EXAMPLES

The present invention will be explained more specifically by the following examples. However, the present invention is not limited thereto.

Example 1

An inflator obtained by mounting the filter 20 shown in FIG. 3(*a*) to the inflator 10 shown in FIG. 1 was used and 60 L tank text was conducted. The details of the inflator are as follows:

A mixture of argon, oxygen and helium was used as the pressurized gas (a charging pressure of 30,000 kPa), and 1 g of nitramine based gas generating agent was used as the gas generating agent.

A filter which had a semi-spherical shape (a diameter of 10.4 mm) made of stainless steel with a thickness of 0.8 mm and that had 15 holes (a diameter of about 1.4 mm) per 1 $cm^2$ converted with a flat plate was used as the filer 20.

A screen having 24 holes (a diameter of about 1.5 mm) per 1 $cm^2$ was used as the screen 21.

60 L tank test was conducted with this inflator. In the 60 L tank test, the inflator was placed in a sealed pressure resistant container with a volume of 60 L (incidentally, the inflator was electrically connected outside the tank), and a pressure change when the inflator was activated in the atmosphere with a temperature of 23° C. was measured. The test was conducted 10 times totally. A result thereof is shown in FIG. 5.

Figure 5:
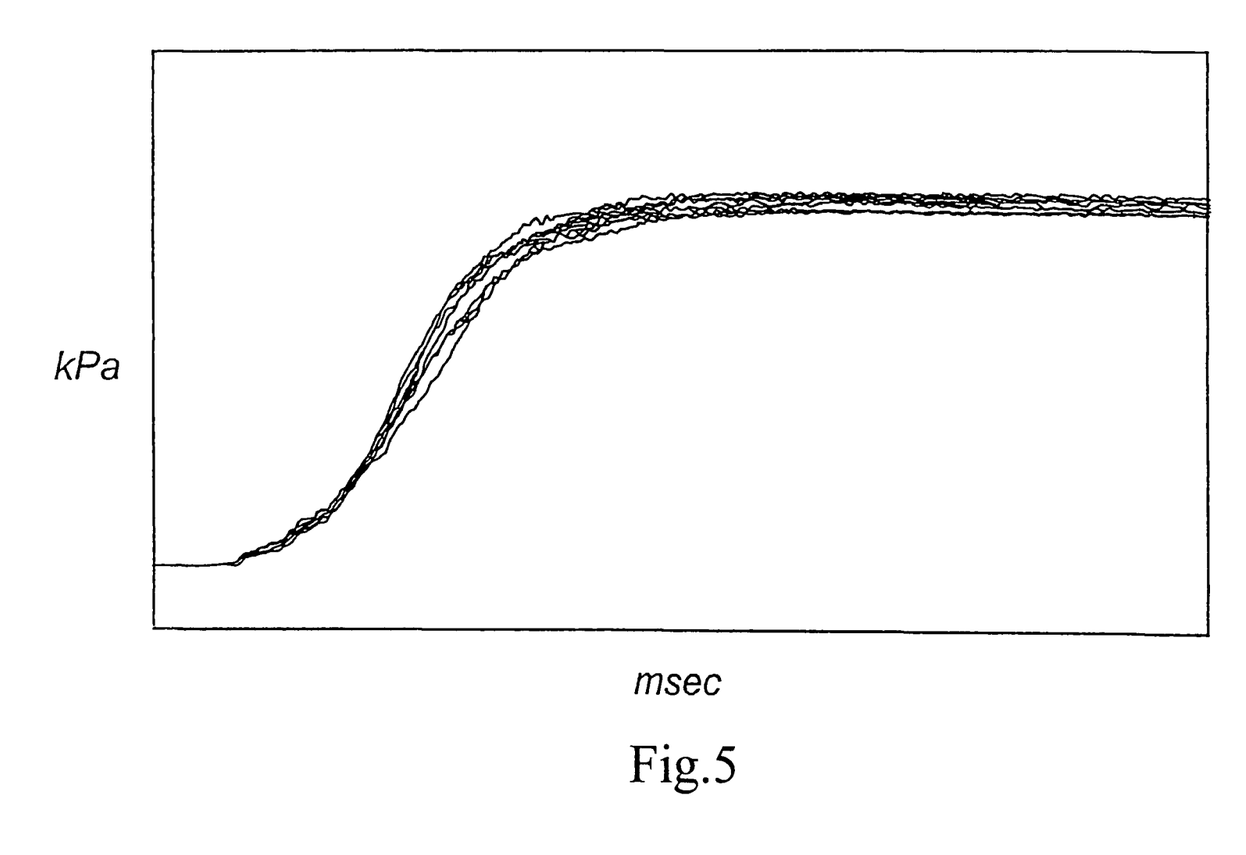
FIG. 5 is a graph showing 60 L tank-test results of the inflator of the present invention.

As apparent from FIG. 5, variations with time in pressure could hardly be found in the results of the total 10 tests, and it was confirmed from a comparison with the test result in FIG. 6 that the flow amount of the pressure gas could be kept constant because the shape of the filter had been changed.

The invention claimed is:

1. An inflator, comprising:
   an inflator housing which has an opening portion and is charged with a pressurized gas;
   a diffuser portion provided in an opening portion side of the inflator housing and having a gas discharging port for discharging outside a pressurized gas flowing from the opening portion at activation;
   a first rupturable plate closing a pressurized gas flow path between the inflator housing and the diffuser portion; and
   a filter disposed between the first rupturable plate and the gas discharging port, the filter including a flat plate with a plurality of holes and a surface of the filter in a first rupturable plate side having a concave portion and a convex portion.

2. The inflator according to claim 1, wherein the convex portion of the filter is formed continuously and the concave portion thereof forms a groove.

3. The inflator according to claim 1 or 2, wherein the convex portion of the filter is formed continuously and the concave portion thereof forms a single or double or more concentric grooves.

4. The inflator according to claim 1 or 2, wherein a flow amount of the pressurized gas is determined by the plurality of holes formed in the filter.

5. An inflator according to claim 1, wherein the convex portion of the filter includes plural independent projections.

6. A filter for an inflator using a pressurized gas to inflate a body to be inflated and preventing foreign matter from entering the body to be inflated, comprising:
   a porous flat plate; and
   a surface facing a pressurized gas flow having a concave portion and a convex portion.

* * * * *